June 18, 1963 J. HOVORKA 3,094,183
FLUID PRESSURE OPERATED WEIGHING SCALES
Filed Dec. 8, 1961
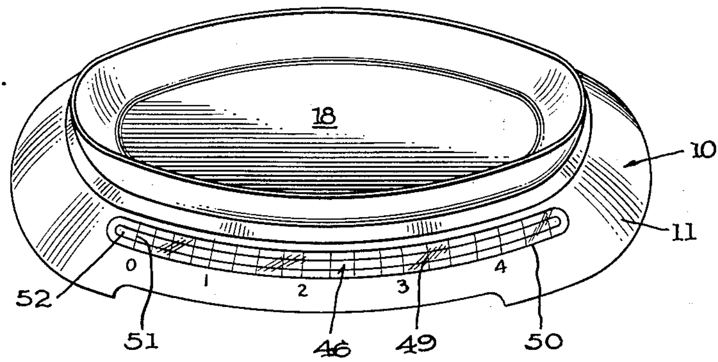
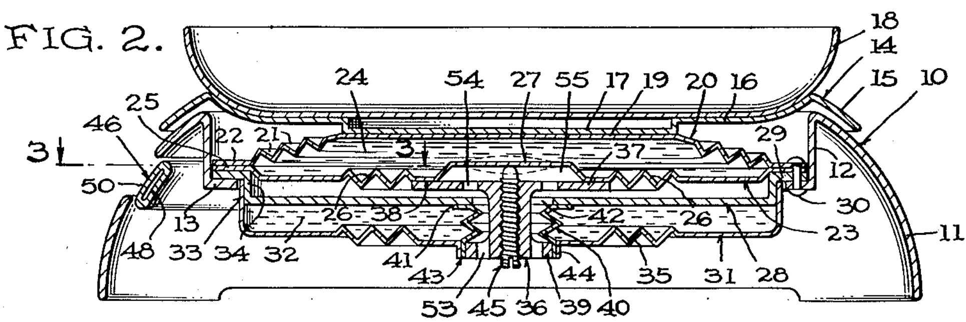
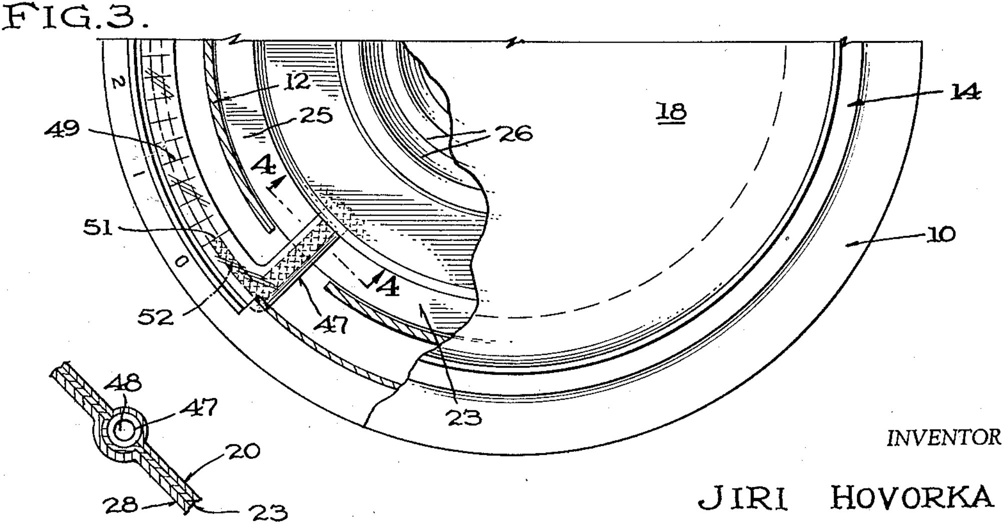
INVENTOR
JIRI HOVORKA
BY B. P. Fishburne, Jr.
ATTORNEY United States Patent Office 3,094,183

Patented June 18, 1963

3,094,183

FLUID PRESSURE OPERATED WEIGHING SCALES

Jiri Hovorka, Morris Plains, N.J., assignor to International Rotary Machine Corporation, Miami Beach, Fla., a corporation of Florida Filed Dec. 8, 1961, Ser. No. 157,919
9 Claims. (Cl. 177—208)

This invention relates to weighing scales of the fluid pressure operated type.

An object of the invention is to provide a scale of the mentioned type which is simplified in construction, extremely compact, economical to manufacture and highly efficient and accurate in operation.

More specifically, the object of the invention is to provide scale mechanism possessing the following important features among others:

(1) Eliminates mechanical wear, mechanical balancing means and artificial forces such as springs;

(2) Compensates automatically for normal temperature changes;

(3) Indicates weight measurements substantially instantaneously;

(4) Adaptable to a wide range of domestic, commercial and industrial sizes and applications;

(5) Readily recalibrated or adjusted periodically by external manual means;

(6) Damage-proof when subjected to weights in excess of measuring capacity;

(7) Unaffected by exposure to dust, humidity or fumes;

(8) Measures weights accurately under sub-freezing or very high ambient temperatures regardless of variations in altitude;

(9) Can serve equally well as a control device actuated by changes in pressure rather than weights, therefore forming a highly accurate pressure switch.

Other objects and advantages of the invention will be apparent during the course of the following description.

In the accompanying drawings forming a part of this application and in which like numerals are employed to designate like parts throughout the same, FIGURE 1 is a perspective view of a weighing scale according to the invention, FIGURE 2 is an enlarged central vertical section through the scale shown in FIGURE 1, FIGURE 3 is a fragmentary horizontal section taken on line 3—3 of FIGURE 2, FIGURE 4 is a fragmentary vertical section taken on line 4—4 of FIGURE 3.

In the drawings, wherein for the purpose of illustration is shown a preferred embodiment of the invention, the numeral 10 designates generally a support and housing for the scale mechanism which is annular in the illustrative embodiment shown in the drawings and characterized by being very low or compact in comparison to its diameter. The housing 10 has an annular marginal wall 11 constituting a leg structure to rest upon a suitable level support and the housing also includes an inner annular wall 12 integral therewith carrying a bottom integral annular flange 13 which is inwardly directed to form a seat for diaphragm means to be described. The wall 12 and flange 13 constitute an upwardly opening chamber or well for the scale mechanism as shown clearly in FIGURE 2.

A pan-like shallow tray receiver 14 is disposed above the housing 10 and rests floatingly upon the diaphragm means to be described and is disposed centrally of the housing 10 and spaced therefrom. The receiver 14 has a marginal annular flange or shoulder 15 overlying the housing wall 11 near its top and this shoulder serves to maintain the receiver 14 centered with respect to the housing 10 and positively limits downward movement of the receiver, as when the scale is overloaded, thereby preventing damage to the scale mechanism. The receiver has a generally flat annular bottom wall portion 16 inwardly of the shoulder 15 and a central flat depressed bottom wall portion 17, as shown.

A preferably shallow tray 18 is removably seated upon the wall portion 16 of the receiver to receive the material to be weighed, as shown in FIGURE 2.

The depressed bottom wall portion 17 of receiver 14 is suitably fixedly secured to a flat horizontal area 19 of a flexible displacement diaphragm 20 which is somewhat concave upwardly and preferably pleated in accordion-fashion as at 21 in the annular region outwardly of the area 19. The diaphragm 20 has a marginal flat annular attachment flange 22 integral therewith which lies inwardly of the annular wall 12 in assembly.

An intermediate double acting flexible diaphragm 23 underlies the diaphragm 20 in spaced relation thereto to form a completely closed chamber 24 filled with a suitable liquid. The diaphragm 23 has a marginal flat annular flange 25 integral therewith which abuts the flange 22 in a fluid tight manner. The diaphragm 23 is preferably pleated as at 26 in the intermediate portion thereof, and further includes a central slightly elevated adjustment or calibrating portion 27.

A substantially rigid partition plate 28 underlies the diaphragm 23 in spaced relation thereto and has an elevated marginal flange 29 which rests upon the flange 13 of the housing and supports the above flanges 22 and 25 of the diaphragms 20 and 23. The several flanges 22, 25 and 29 are rigidly secured to the support flange 13 by a multiplicity of circumferentially spaced fastener elements 30 and as previously stated, the diaphragm flanges 22 and 25 are in fluid sealing engagement.

A compensating flexible diaphragm 31 underlies the plate 28 in spaced relation thereto to form therewith a second closed chamber 32 which is completely filled with a charge of the same liquid contained in the chamber 24. The marginal portion 33 of the diaphragm 31 is suitably secured to the annular portion 34 of plate 28 in a fluid tight manner just inwardly of the flange 13. The diaphragm 31 is preferably pleated as at 35.

A central rigid connector 36 has an upper flange 37 sealed at 38 in a fluid tight manner to the bellows 23 just outwardly of the calibrating portion 27. The connector 36 has a bottom flange 39 received by a central opening in the diaphragm 31. A central sealing bellows 40 has its upper end 41 sealed to the plate 28 in a fluid tight manner, surrounding a central opening 42 in the plate which receives the connector 36. The lower end 43 of the bellows 40 is similarly sealed in a fluid tight manner to the connector flange 39 in surrounding relation therewith and the corresponding lower flange 44 of diaphragm 31 is secured in a fluid tight manner to the lower end of the bellows 40, as shown in FIGURE 2. The chamber 32 is thus rendered entirely closed and fluid tight.

The connector 36 is internally screw-threaded to receive an adjusting or calibrating screw 45 whose inner end contacts the calibrating portion 27 of diaphragm 23.

It should be mentioned here that the complete area of double acting diaphragm 23 exposed to fluid pressure must equal the corresponding exposed surface area of the compensating diaphragm 31. Additionally, the volume of chamber 24 is equal to the volume of closed chamber 32. For proper and accurate performance, diaphragms 23 and 31 are fabricated from the same material and have equal thickness and flexibility and these are matters which can be readily worked out by proper engineering design. Where the mentioned pleats or corrugations are provided in the diaphragms, the number of such corrugations will be such in each case so as to obtain the longest practical life by maintaining material fatigue to a minimum as occasioned by movement of the parts.

A transparent capillary scale or indicator tube 46 is connected between the displacement diaphragm 20 and the double acting diaphragm 23 and is therefore in direct communication with the liquid filled chamber 24. As shown in FIGURES 3 and 4, a radial end portion 47 of the indicator tube 46 projects into the chamber 24 and is suitably sealed between the marginal flanges 22 and 25 of the diaphragms 20 and 23. Therefore, the bore 48 or passageway through the capillary tube 46 communicates directly with the closed chamber 24. The capillary tube 46 has a graduated scale 49 visibly marked thereon to indicate the weights of materials placed upon the tray 18. The capillary or indicator tube 46 has its main arcuate portion fixed to the housing 10 in any suitable manner adjacent to a slot 50 formed through the outer wall 11 of the housing to provide visibility.

The liquid charge which completely fills the chamber 24 as previously stated also fills the radial branch 47 of the tube 46 and the liquid extends to a point within the tube 46 where the zero scale marking 51 is located. The numeral 52, FIGURE 3, designates the quantity of liquid from the chamber 24 which extends into the indicator tube in the normal manner when the scale is unloaded. As previously stated, an exactly similar liquid charge fills the other chamber 32 of the device and the liquid charges in the two closed chambers are exactly equal in volume and are hermetically sealed therein. The liquid employed is of a type which will not freeze except at extremely low temperatures, and is of a suitable color either naturally or through the use of additives to be easily visible through the clear material from which the tube 46 is made, such as glass or a clear plastics material. That portion of the capillary tube 46 which does not contain a part of the liquid charge in the chamber 24 is under vacuum beyond the point 51 shown in FIGURE 3.

In operation, when the scale unit is completely assembled and the tray 18 in place and empty, the liquid charge filling the chamber 24 extends to the zero marking 51 of the indicator tube 46. When material to be weighed is placed upon the tray 18, the bellows-like action of the displacement diaphragm 20 displaces a portion of the liquid charge in the chamber 24 into the evacuated portion of the capillary tube 46 adjacent to the indicator scale 49. The displacement diaphragm 20 is specifically designed for any particular scale depending upon the range of weights which the scale is to measure, so that the amount of displacement of the enclosed liquid charge in the chamber 24 when the diaphragm 20 is flexed will depend upon the actual weight of the material placed upon the scale tray 18. In the event that the material is of less weight than the scale range, no displacement will occur. If the material placed on the tray 18 is of total weight greater than the scale range, the shoulder 15 of tray receiver 14 will engage the housing 10 before excessive diaphragm displacement or damage can occur. Within the designed weight range, the exact weight of the material placed upon the tray 18 will be indicated by the scale 49 of capillary tube 46, as should now be obvious.

Unless some compensating means is provided in the scale mechanism, an increase or decrease in ambient temperature would cause expansion or contraction of the liquid charge in the chamber 24, and as a result, the liquid portion 52 in the capillary tube would advance beyond or retreat behind the zero scale marking 51, giving erroneous weight indications. However, the necessary compensating means is provided. Any increase or decrease in the volume of liquid in the chamber 24 due to temperature change is matched by an exactly equal volume change in the liquid charge in the chamber 32, and which chamber 32 has no inlet or escape passage and is completely and permanently closed. The expansion or contraction of liquid in the chamber 32 is therefore permitted by the flexing action of compensating diaphragm 31, which causes sufficient movement axially of the rigid connector 36 to effect an equal degree of flexing in the double acting diaphragm 23. Thus, any change in the volume of liquid in chamber 24 due to temperature change is matched by an equal change in the volume of the main portion of its enclosure, so that the liquid portion 52 continues to stay at the zero point 51 in the bore or passage 48, unless a measurable weight is placed upon the scale tray. This equilibrium is only possible because the liquid charges in chambers 24 and 32 are of equal volume and the exposed areas of double acting diaphragm 23 and compensating diaphragm 31 are equal, as are their thicknesses and material of construction.

It is also recognized that over a period of time, some fatigue of the various diaphragms will be experienced due to repeated flexures thereof. When such fatigue causes a minute volume change in the chamber 24, an equal and opposite volume change may be readily obtained by operating the calibrating screw 45 which causes the calibrating diaphragm portion 27 to counteract the volume change in the chamber 24 caused by material fatigue. Fine accuracy of weight measurement is therefore assured in spite of expected or normal temperature changes and in spite of fatigue or other factors which might change the characteristics of the diaphragms.

The flanges 39 and 37 of connector 36 are vented at 53 and 54 so that the small chamber 55 below calibrating diaphragm portion 27 is open to the atmosphere.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A weighing scale comprising a shallow housing base, a diaphragm assembly mounted upon the base and recessed bodily below the top of said base and including a liquid filled displacement chamber and a closed liquid filled compensating chamber, an indicator tube connected with and communicating with the displacement chamber and having an indicating scale visible thereon and extending substantially horizontally and circumferentially of the base and visible at one side of the base, a shallow tray structure mounted upon the diaphragm assembly to transmit the weight of material to be weighed directly to the displacement chamber, and mechanical means accessible at the bottom of said diaphragm assembly and bodily carried thereby to finely adjust and calibrate the volume of the displacement chamber.

2. A weighing scale comprising a support housing having an interior wall forming a recess within the top of the housing, a multiple superposed diaphragm assembly secured to the housing entirely within said recess and forming a displacement chamber and compensating chamber having equal volumes, liquid charges of the same liquid within and filling said chambers, a visible indicator communicating with the displacement chamber and receiving the liquid therefrom and extending horizontally adjacent a side wall portion of said support housing, a shallow tray structure floatingly mounted upon the top of the diaphragm assembly for transmitting pressure directly to said displacement chamber under the weight of the material to be weighed, and means extending from the bottom of said diaphragm assembly and operable to minutely adjust the volume of the displacement chamber.

3. In a weighing scale, a low relatively wide support housing having an interior wall defining an interior recess in the top of the housing, a diaphragm assembly disposed within said recess entirely below the top of the housing and secured to the interior wall, said diaphragm assembly comprising a top displacement diaphragm and a coacting intermediate double acting diaphragm below the displacement diaphragm and defining therewith a liquid filled displacement chamber, said assembly further comprising a bottom compensating diaphragm and an intermediate substantially rigid plate member between said double acting and compensating diaphragms, said compensating diaphragm and plate member defining between them a closed liquid filled compensating chamber of volume equal to said displacement chamber, an indicator tube connected with and communicating with said displacement chamber and visible exteriorly of the housing and extending horizontally adjacent an exterior side wall portion of said support housing, said exterior side wall portion having a horizontally elongated opening adjacent said indicator tube, a shallow tray structure mounted directly upon the displacement diaphragm to transmit the weight of material thereto and including a marginal flange engageable with the support housing to positively limit downward movement of the displacement diaphragm, a rigid connector element interconnecting said double acting and compensating diaphragms and separated from said closed compensating chamber, and a calibrating screw carried by said connector element and engaging a movable compensating portion of said intermediate double acting diaphragm and projecting below said connector element and accessible at the bottom of the diaphragm assembly and at the bottom of said support housing.

4. The invention according to claim 3, and a flexible bellows surrounding and connected with said element and secured to said plate member and constituting a flexible interior wall of said compensating chamber.

5. The invention according to claim 3, and coacting parts on said housing and tray structure to limit the extent of movement of the tray structure under load and thereby avoiding excessive or damaging pressure on said displacement diaphragm.

6. The invention according to claim 3, and wherein said diaphragms are corrugated at least in part.

7. A weighing scale of highly compact construction comprising a broad shallow base having a top opening interior recess, a diaphragm assembly mounted upon the base entirely below the top thereof and entirely within the recess and being broad and relatively shallow and including an upper displacement chamber and a lower compensating chamber, said chambers filled with equal volumes of a like liquid, an indicator tube bearing a visible scale connected in said displacement chamber and exposed to view at one side of said base and extending substantially horizontally along a substantial exterior side wall portion of said base, and a broad and shallow tray unit mounted bodily upon the top of said diaphragm assembly and contacting the latter over a substantial portion of its area to transmit the weight of material to be weighed directly to said displacement chamber and having a marginal flange adapted to engage said base to positively limit downward displacement of said tray unit under load.

8. The invention according to claim 7, and a connector element disposed centrally of the diaphragm assembly and secured to the same, and a movable calibrating element carried by the connector element and bearing upon one flexible wall of said displacement chamber.

9. The invention according to claim 7, and wherein the diaphragm assembly comprises in spaced superposed relation a top displacement diaphragm, an intermediate double acting diaphragm, a bottom compensating diaphragm and a substantially rigid plate member between said double acting and compensating diaphragms, said displacement and double acting diaphragms defining said displacement chamber and said plate member and compensating diaphragm defining said compensating chamber, and screw-threaded calibrating means carried by said assembly to flex and thereby calibrate the central portion of said double acting diaphragm to compensate for changes in the physical characteristics of the diaphragms after lengthy use.

References Cited in the file of this patent

UNITED STATES PATENTS

| | | |
|---|---|---|
| 1,771,339 | Martin | July 22, 1930 |
| 2,577,100 | Alvarez | Dec. 4, 1951 |